(12) United States Patent
Hinkle

(10) Patent No.: US 11,098,751 B2
(45) Date of Patent: Aug. 24, 2021

(54) LINK AND BALL SOCKET ASSEMBLY FOR VEHICLE POSITION SENSOR

(71) Applicant: CTS Corporation, Lisle, IL (US)

(72) Inventor: Jay L. Hinkle, Bartlett, IL (US)

(73) Assignee: CTS Corporation, Lisle, IL (US)

( * ) Notice: Subject to any disclaimer, the term of this patent is extended or adjusted under 35 U.S.C. 154(b) by 664 days.

(21) Appl. No.: 16/025,609

(22) Filed: Jul. 2, 2018

(65) Prior Publication Data

US 2019/0010975 A1    Jan. 10, 2019

Related U.S. Application Data

(60) Provisional application No. 62/529,760, filed on Jul. 7, 2017.

(51) Int. Cl.
| | | |
|---|---|---|
| *F16C 11/06* | (2006.01) | |
| *F16C 7/02* | (2006.01) | |
| *B60G 7/00* | (2006.01) | |
| *G01D 11/24* | (2006.01) | |

(52) U.S. Cl.
CPC .......... *F16C 11/0623* (2013.01); *B60G 7/001* (2013.01); *F16C 7/02* (2013.01); *F16C 11/0604* (2013.01); *F16C 11/069* (2013.01); *F16C 11/0657* (2013.01); *B60G 2204/116* (2013.01); *B60G 2204/416* (2013.01); *B60Y 2400/301* (2013.01); *F16C 2226/62* (2013.01); *G01D 11/245* (2013.01)

(58) Field of Classification Search
CPC .............. F16C 11/0604; F16C 11/0642; F16C 11/0647; F16C 11/06; F16C 11/0628; F16C 11/0633; F16C 11/0652; F16C 11/086; Y10T 403/32713–32729; Y10T 403/32754; Y10T 403/32762
See application file for complete search history.

(56) References Cited

U.S. PATENT DOCUMENTS

| | | | |
|---|---|---|---|
| 3,527,485 A | 9/1970 | Goward et al. | |
| 4,225,261 A * | 9/1980 | Marx | F16C 11/069 280/513 |
| 5,865,558 A | 2/1999 | Cebollero | |
| 6,609,850 B2 * | 8/2003 | Greb | F16C 11/0647 403/137 |
| 9,134,200 B2 | 9/2015 | Waite et al. | |

FOREIGN PATENT DOCUMENTS

| | | |
|---|---|---|
| EP | 0733815 A2 | 9/1996 |
| GB | 2064640 A | 6/1981 |
| GB | 2344400 A | 6/2000 |

* cited by examiner

*Primary Examiner* — Daniel J Wiley
(74) *Attorney, Agent, or Firm* — Daniel Deneufbourg

(57) ABSTRACT

A link and ball socket assembly for a vehicle position sensor comprising a first molded member including a link and a first socket and a second molded member including a second socket coupled to the first molded member. The first socket is molded to and integral with a first end of the link and the second socket is coupled to and rotatable relative to a second opposed end of the link. The first socket defines an interior ball receiving pocket. The interior pocket defines a first back pocket portion which opens into a second front ball shaped pocket portion. The ball is received in the first back pocket portion and slid and snapped into the second front pocket portion. A locking pin is inserted into the interior pocket into a relationship abutting against the ball for retaining the ball in the socket.

13 Claims, 4 Drawing Sheets

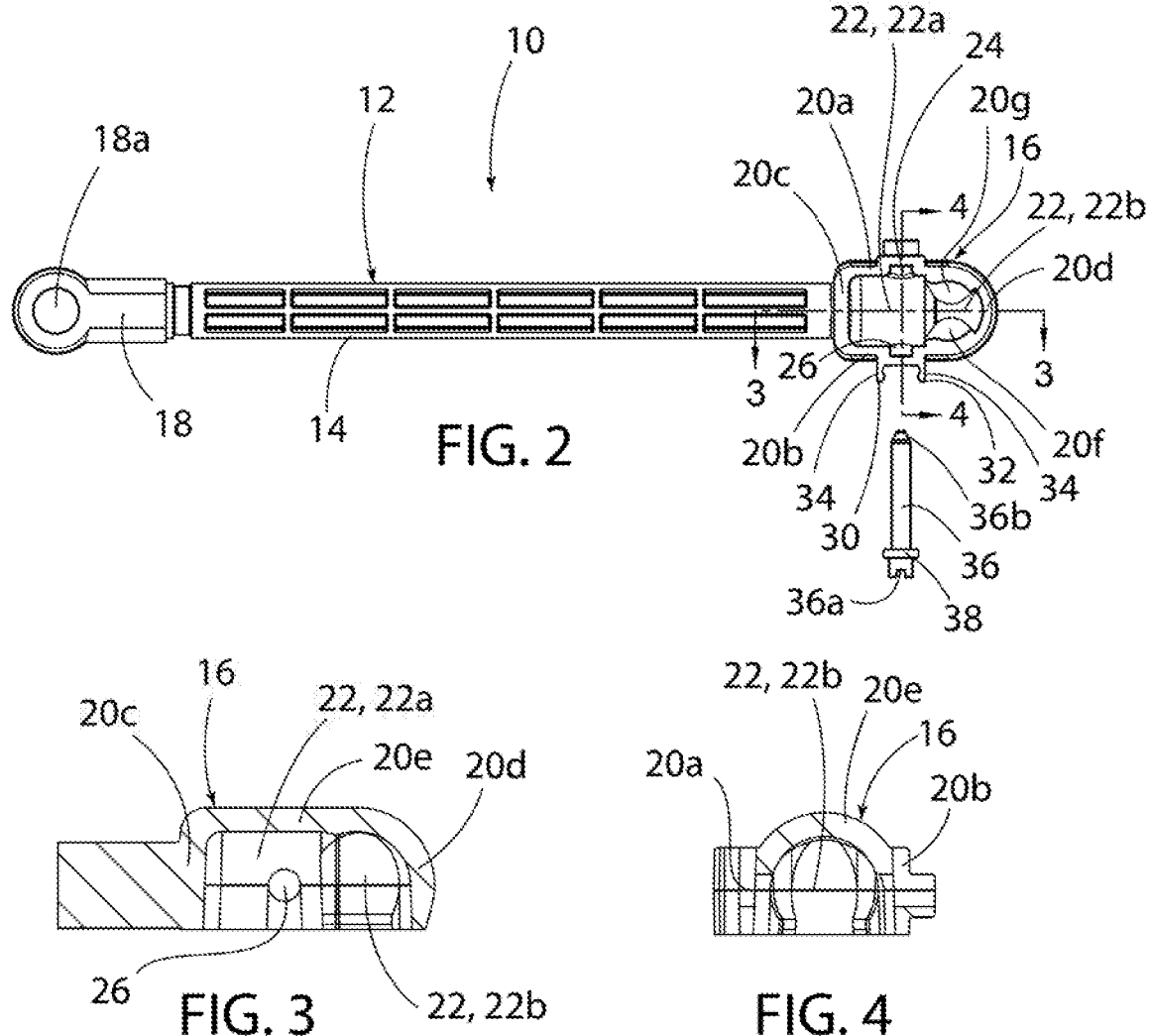

LINK AND BALL SOCKET ASSEMBLY FOR VEHICLE POSITION SENSOR

CROSS-REFERENCE TO RELATED APPLICATIONS

This patent application claims priority and benefit of the filing date of U.S. Provisional Patent Application Ser. No. 62/529,760 filed on Jul. 7, 2017, the disclosure and contents of which is expressly incorporated herein in its entirety by reference.

FIELD OF THE INVENTION

This invention relates to a link and ball socket assembly for a vehicle position sensor and, more specifically, to link and ball socket assembly for a vehicle chassis position sensor.

BACKGROUND OF THE INVENTION

Vehicle chassis position sensors that utilize a link and ball socket assembly for coupling a vehicle chassis position sensor to the ball stud of a vehicle's chassis are known in the art such as, for example, the link and ball socket assembly of the vehicle chassis sensor disclosed in U.S. Pat. No. 9,134,200 to Waite et al., the disclosure and contents of which are expressly incorporated herein by reference.

The present invention is directed to a new low cost link and ball socket assembly for a vehicle chassis sensor.

SUMMARY OF THE INVENTION

The present invention is generally directed to a link and ball socket assembly for a vehicle position sensor comprising a first molded member including a link and a first socket and a second molded member including a second socket coupled to the first molded member.

In one embodiment, the first socket is molded to and integral with a first end of the link and the second socket is coupled to and rotatable relative to a second opposed end of the link.

In one embodiment, the first molded member is made of a rigid thermoplastic material and the second molded member is made of an elastomeric material.

In one embodiment, the first socket defines an interior pocket adapted to receive a ball and further comprising a locking pin extending into the socket for locking the ball in the interior pocket.

In one embodiment, the interior pocket of the socket defines a first back pocket portion which opens into a second front ball shaped pocket portion, the ball being received in the first back pocket portion and slid and snapped into the second front ball shaped pocket portion, the locking pin extending into the interior of the pocket into a relationship abutting against the ball for securing the ball in the socket.

In one embodiment, the socket includes a pair of clips, the pin including a collar abutting against the clips for securing the locking pin to the socket.

The present invention is also directed to a link and ball socket assembly for a vehicle chassis position sensor, the link and ball socket assembly comprising an elongate link, a socket at one distal end of the link, the socket defining an interior cavity including a first portion and a second ball shaped portion in communication with the first portion, the socket adapted to receive a ball, and a locking pin extending into the first portion in a relationship abutting against the ball for locking the ball in the socket.

In one embodiment, the socket includes a wall defining a through aperture, the locking pin extending through the aperture and into the socket.

In one embodiment, flexible clips project outwardly form the wall of the socket, the locking pin including a collar abutting against the clips for retaining the locking pin in the socket.

In one embodiment, the locking pin includes a distal end with an angled surface for guiding the locking pin into the aperture into the wall of the socket.

In one embodiment, the link and the socket comprise a molded member.

In one embodiment, another socket is coupled to the other distal end of the link and rotatable relative thereto.

In one embodiment, the link and the other socket comprise a molded member.

The present invention is also directed to a link and ball socket assembly for a vehicle chassis position sensor, the link and ball socket assembly comprising an elongate link, a first socket at one distal end of the link, the socket defining an interior cavity including a first portion and a second ball shaped portion in communication with the first portion, the socket adapted to receive a ball, the socket including a first wall defining an interior recess in communication with the interior cavity and a second wall with a through aperture in communication with the interior cavity and a pair of clips projecting outwardly from an exterior surface thereof, a locking pin including a first distal end and an opposed distal end with a collar, the locking pin extending through the aperture in the second wall of the socket and into the first portion of the socket into a relationship with the first distal end of the locking pin seated in the recess in the first wall of the socket and the collar of the locking pin abutted against the clips for retaining the locking pin on the socket, and a second socket coupled to an opposed distal end of the link, the second socket being rotatable relative to the link.

In one embodiment, the first socket and the link define a first molded member and the second socket and the link define a second molded member.

Other advantages and features of the present invention will be more readily apparent from the following detailed description of the preferred embodiments of the invention, the accompanying drawings, and the appended claims.

BRIEF DESCRIPTION OF THE DRAWINGS

These and other features of the invention can best be understood by the description of the accompanying FIGURES as follows:

FIG. 2 is a top plan view of the link and ball socket assembly shown in FIG. 1;

FIG. 3 is a cross-sectional view of the link and ball socket assembly taken along the line 3-3 in FIG. 2;

FIG. 4 is a cross-sectional view of the link and ball socket assembly taken along the line 4-4 in FIG. 3;

DESCRIPTION OF THE EMBODIMENT

Figure 1:
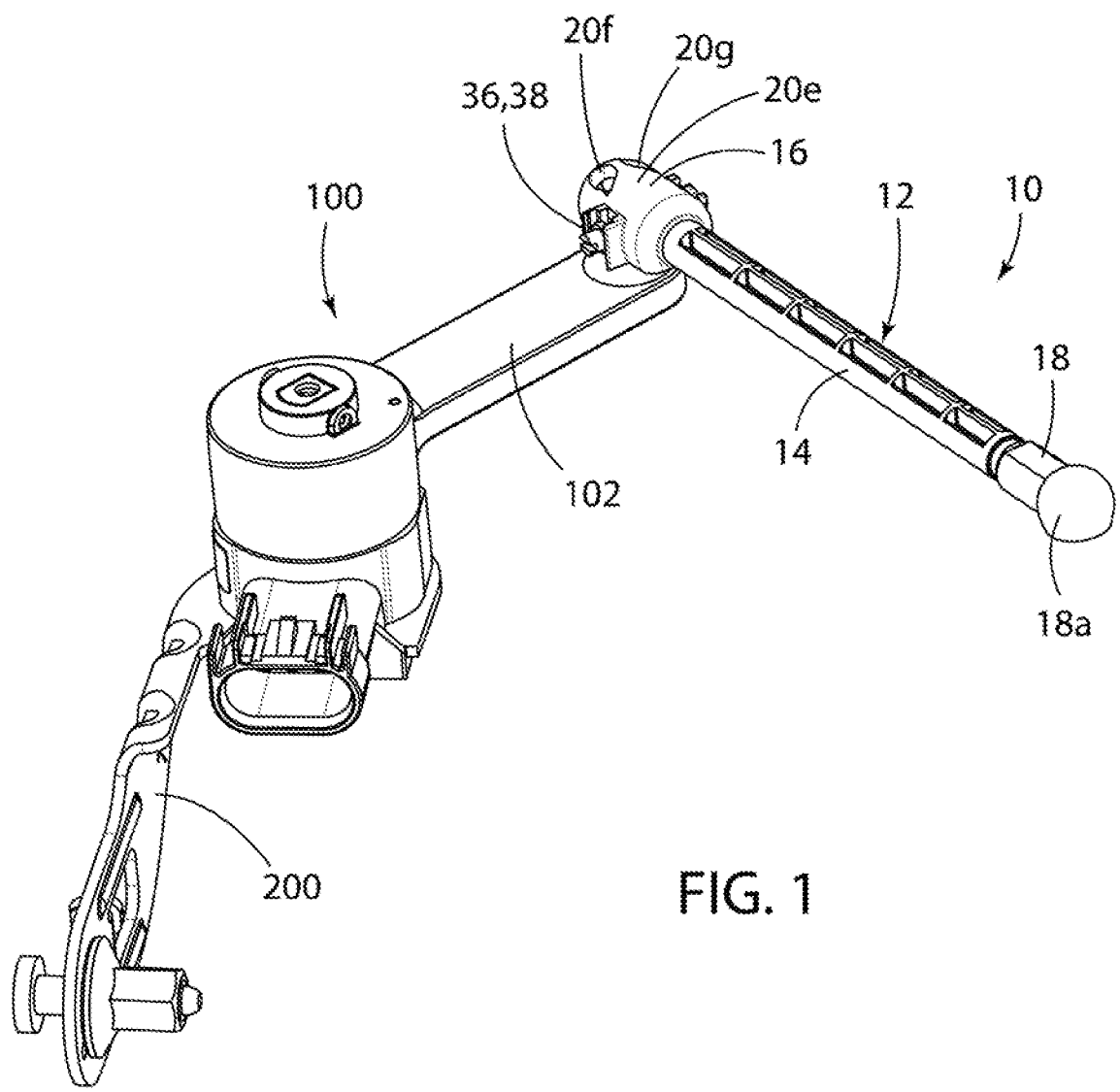
FIG. 1 is a perspective view of a link and ball socket assembly in accordance with the present invention coupled to a vehicle chassis position sensor.

FIG. 1 shows a link and ball socket assembly 10 in accordance with the present invention which, in the embodiment shown, is adapted for use with and connection to a vehicle position sensor 100 which, in the embodiment shown, is in the form of a vehicle chassis position sensor 100 of the type disclosed in U.S. Pat. No. 9,134,200 to Waite et al., the disclosure and contents of which are incorporated herein by reference.

In the embodiment shown, the vehicle chassis position sensor 100 is fixed to a metal chassis bracket 200 which is coupled to a motor vehicle frame or body component (not shown) which is sprung by the vehicle suspension system (not shown). The link and ball socket assembly 10 couples a rotary arm member 102 of the sensor 100 to an unsprung or moveable component of the vehicle's chassis (not shown) such as, for example, a rear axle, a steering knuckle, a hub component, or such other component which moves with the road engaging wheels and tires (which are unsprung vehicle chassis components). Relative motion (jounce) between the sprung and unsprung components of the vehicle chassis cause the rotary motion of the rotary arm member 102. This rotary motion is sensed by the sensor 100 and is converted into electrical signals used for various control functions.

The link and ball socket assembly 10 comprises a link and integral lock pin socket member 12 including an elongate bar or link 14. A lock pin socket 16 unitary with the elongate link 14 and, more specifically, is unitary with and extends outwardly from a first distal end of the elongate link 14 in a relationship generally co-linear with the longitudinal axis of the elongate bar or link 14. Another socket 18 is molded to, and extends outwardly from, the distal end of the elongate bar or link 14 opposite the distal end of the socket with the integral socket 16. The socket 18 is adapted for connection to the ball stud (not shown) of a vehicle's chassis (not shown).

The link and integral lock pin socket member 12 is a first molded member that is made of a rigid thermoplastic material in a first molding operation and, more specifically, is a molded member in which the combination of the link 14 and integral lock pin socket 16 comprise a single molded unitary piece or member made during a first molding operation.

The socket 18 comprises a separate second molded member that is made during a second molding operation and uses the first molded member as an insert. The socket 18 defines an interior ball receiving pocket 18a, is made of an elastomeric material, and is rotatable relative to the distal end of the link 14.

Although the FIGS. depict a link 14 of a given length, it is understood that the link 14 may be of any desired length depending upon the particular application and, more specifically, may be a link in which the length can be varied between about 47 mm to 200 mm depending upon the particular application.

Referring to FIGS. 2, 3, and 4 in particular, the integral lock pin socket 16 includes a pair of straight side walls 20a and 20b, a straight back wall 20c, a front curved wall 20d, and a top curved wall or dome 20e which in combination define an interior open and hollow pocket 22 and, more specifically, an interior open and hollow pocket 22 including a first interior open and hollow rectangular shaped back pocket portion 22a adjacent the back wall 20c that opens into and is in open communication with a second interior open and hollow front ball shaped pocket portion 22b adjacent the front curved wall 20d.

The side wall 20a of the socket 16 defines an interior circular recess or groove 24 that opens into and is in communication with the interior pocket 22 and, more specifically, a circular recess or groove 24 that opens into and is communication with the interior pocket portion 22a.

The side wall 20b is located opposite and spaced from and generally parallel to the side wall 20a and defines a through-hole or opening 26 that opens into and is in communication with the interior socket pocket 22 and, more specifically, a through-hole or opening 26 that opens into and is in communication with the interior pocket portion 22a. The interior recess or groove 24 in the side wall 20a and the through-hole or opening 26 in the side wall 20b are disposed relative to each other in an opposed and co-linear relationship.

The side wall 20b also includes a pair of spaced apart and parallel fingers or prongs or tabs 30 and 32 projecting normally outwardly from the exterior surface of the side wall 20b. The distal end of each of the fingers or prongs 30 and 32 includes and defines an interior shoulder or clip 34. The pair of abs 30 and 32 are flexible as described in more detail below. The through-hole aperture 26 is located between the tabs 30 and 32.

The top wall 20e defines a pair of side-by-side through apertures 20f and 20g which are in open communication with the pocket portion 22b.

The socket 16 still further includes an elongate lock pin 36 with a distal end or slotted head 36a and is adapted to be inserted into the link socket 16 in a manner as described in more detail below.

The pin 36 further includes a radial ring or collar 38 extending radially outwardly from the exterior surface of the pin 36. In the embodiment shown, the ring or collar 38 is located in a relationship adjacent and spaced from the distal end of the pin 36 including the head 36a and, more specifically, is located in a relationship abutting against the head 36a.

The pin 36 also includes a cone shaped/angled guide end 36b opposite the distal end with the head 36a.

The method and process for coupling the ball or stud 40 of the arm 102 of the sensor 100 to the socket 16 of the link 14 will now be described with reference to FIGS. 5, 6, 7, and 8.

Figure 5:
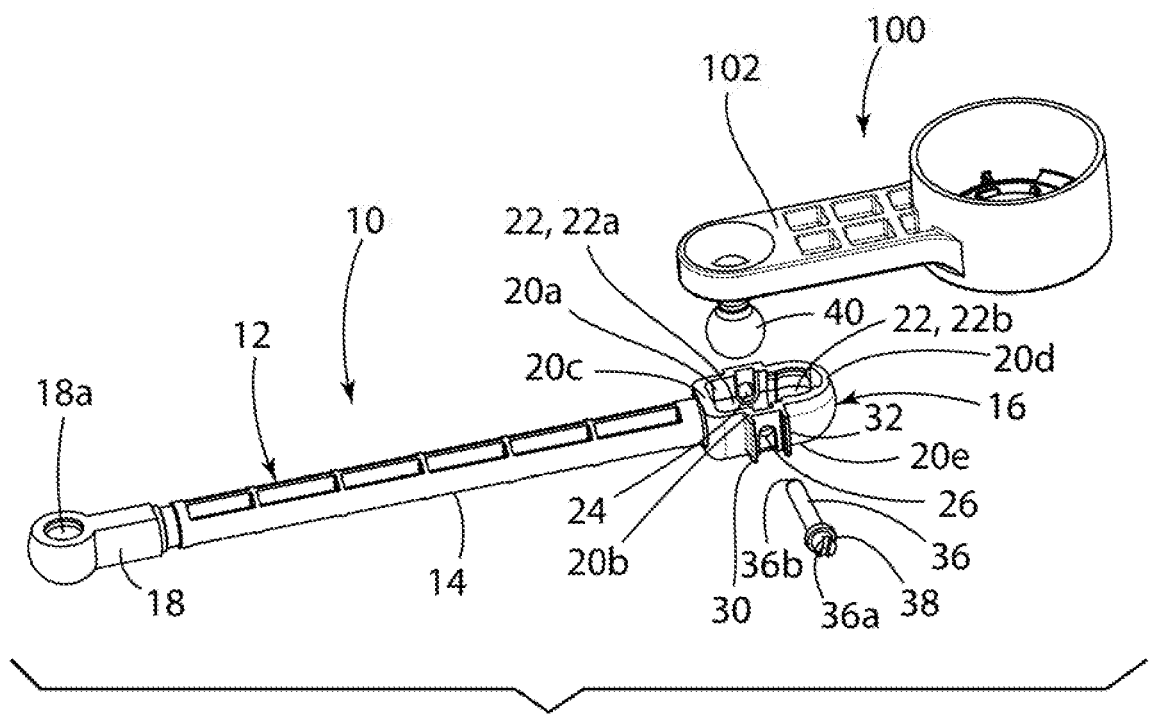
FIG. 5 is a perspective view depicting the assembly of the ball stud of the arm of the vehicle chassis sensor to the integral pin socket of the link and ball socket assembly.

Initially, as shown in FIG. 5, the ball 40 is positioned relative to the socket 16 in a relationship with the ball 40 located directly opposite the pocket 22 and, more specifically, in a relationship with the ball 40 located directly opposite the rectangular back portion 22a of the pocket 22 of the socket 16.

Figure 6:
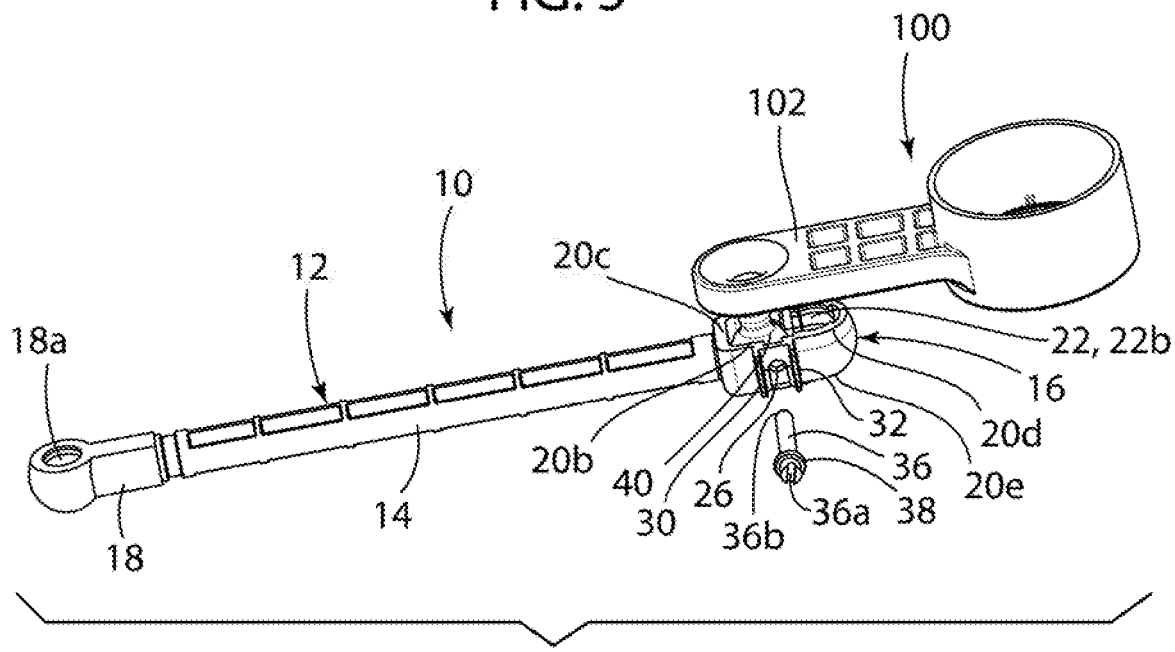
FIG. 6 is another perspective view depicting the assembly of the ball stud of the arm of the vehicle chassis sensor to the integral pin socket of the link and ball socket assembly.

Thereafter, as shown in FIG. 6, the ball 40 and the socket 16 are brought together into a relationship with the ball 40 located in the interior of the pocket 22 and, more specifically, into a relationship with the ball 40 located in the interior of the back portion 22a of the pocket 22 of the socket 22.

Figure 7:
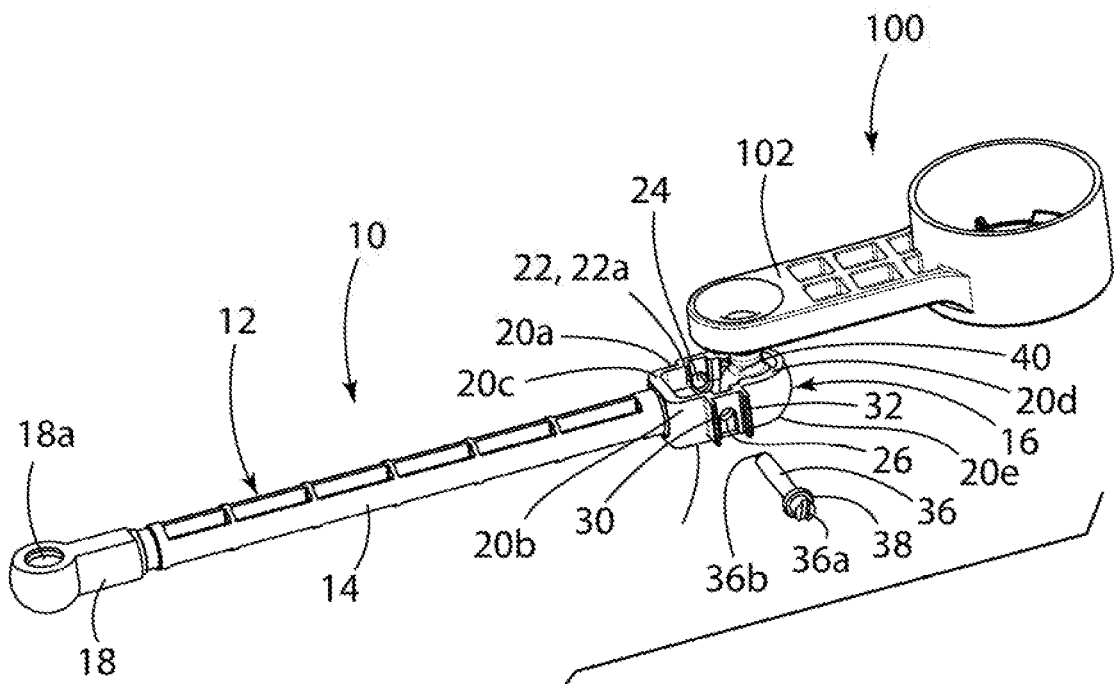
FIG. 7 is yet another perspective view depicting the assembly of the ball stud of the arm of the vehicle chassis sensor to the integral pin socket of the link and ball socket assembly.

Thereafter, as shown in FIG. 7, the ball 40 and the socket 16 are manipulated and moved relative to each other in a manner in which the ball 40 is slid and moved forwardly from the back pocket portion 22a of the pocket 22 to the front pocket portion 22a and, more particularly, in a manner in which the ball 40 is snap fit into the front pocket portion 22b of the pocket 22.

Figure 8:
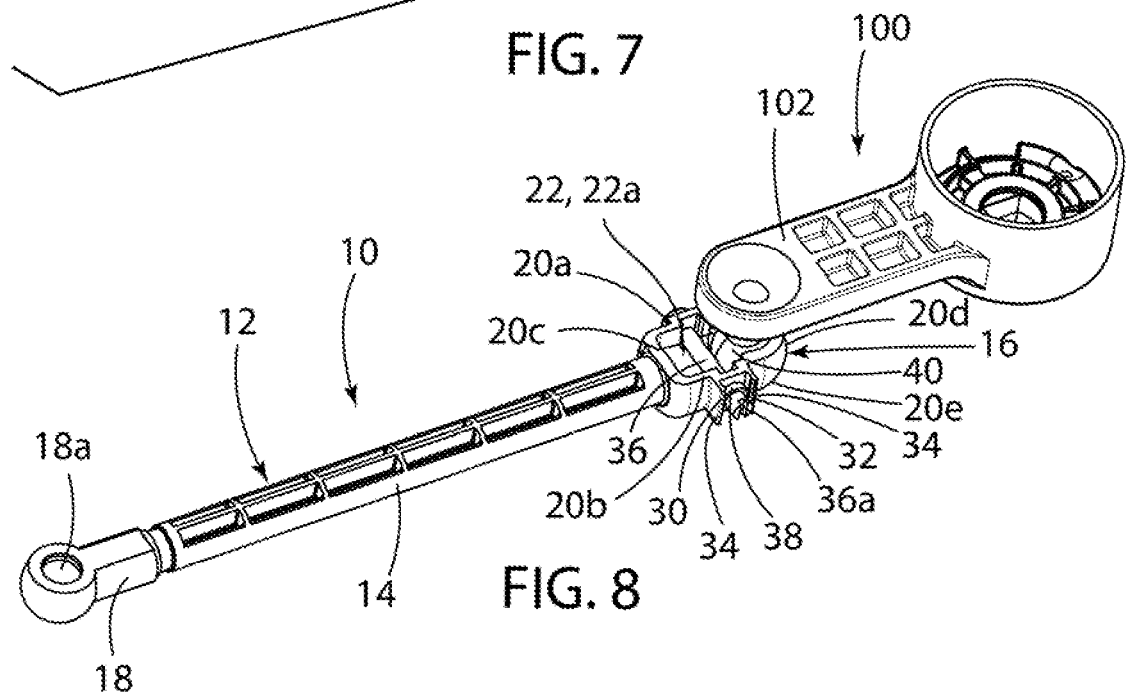
FIG. 8 is a perspective view depicting the ball stud of the arm of the vehicle chassis sensor secured to the integral pin socket of the link and ball socket assembly.

Thereafter, as shown in FIGS. 7 and 8, the pin 36 is inserted into the socket 22 to lock the ball 40 in the front pocket portion 22a of the pocket 22 and, more specifically, to lock the ball 40 in the pocket 22.

More specifically, the conical distal end 36b of the pin 36 is inserted through the aperture 26 defined in the socket side wall 20b and extended through the interior of the pocket 22 and, more specifically, is extended through the interior of the portion 22a of the interior pocket 22 into the relationship as shown in FIG. 8 with the cone shaped distal end 36a of the pin 36 seated in the recess or groove 24 formed in the interior surface of the socket side wall 20a and the head 36a of the pin 36 located between the pair of tabs 30 and 32 projecting outwardly from the exterior surface of the socket side wall 20b.

The combination of the tabs 30 and 32 on the socket 16 and the cone shaped distal end 36a on the pin 36 locate and guide the pin 36 through the aperture 26 during insertion of the pin 36 into the socket 16.

Moreover, the clips 34 on the respective distal ends of the respective tabs 30 and 32 include respective interior angled surfaces that allow for the tabs 30 and 32 to be flexed away from each other following abutting contact of the respective clips 34 with the collar 38 of the pin 36 upon insertion of the pin 36 into the socket 16 and to flexed back towards each other in response to the collar 38 clearing the clips 34 for locking the pin 36 in the socket 16.

Moreover, in the relationship as shown in FIG. 8 with the pin 36 locked in the socket 16, the pin 36 is positioned in a relationship abutting against the exterior surface of the ball 40 thereby locking the ball 40 in the socket 16 and also preventing the ball 40 from exiting the socket 16.

Numerous variations and modifications of the link and ball socket assembly described above may be effected without departing from the spirit and scope of the novel features of the invention. It is to be understood that no limitations with respect to the specific link and ball socket assembly illustrated herein are intended or should be inferred. It is, of course, intended to cover by the appended claims all such modifications as fall within the scope of the claims.

What is claimed is:

1. A link and ball socket assembly for a vehicle position sensor comprising:
   a first molded member including a link and a first socket; and
   a second molded member including a second socket coupled to the first molded member;
   wherein the first socket defines an interior pocket adapted to receive a ball and further comprising a locking pin extending into the first socket;
   wherein the interior pocket defines a first back pocket portion which opens into a second front ball shaped pocket portion, the ball being received in the first back pocket portion and slid away from the second socket and snapped into the second front ball shaped pocket portion, the locking pin extending into the interior pocket into a relationship abutting against the ball for securing the ball in the first socket.

2. The link and ball socket assembly of claim 1 wherein the first socket is molded to and integral with a first end of the link and the second socket is coupled to and rotatable relative to a second opposed end of the link.

3. The link and ball socket assembly of claim 1 wherein the first molded member is made of a rigid thermoplastic material and the second molded member is made of an elastomeric material.

4. The link and ball socket assembly of claim 1 wherein the first socket includes a pair of clips, the locking pin including a collar abutting against the clips for securing the locking pin to the first socket.

5. A link and ball socket assembly for a vehicle chassis position sensor, the link and ball socket assembly comprising:
   an elongate link having opposing first and second distal ends;
   a socket at the first distal end of the elongate link, the socket defining an interior cavity including a first portion and a second ball shaped portion in communication with the first portion and extending in a direction away from the second distal end, the socket adapted to receive a ball; and
   a locking pin extending into the first portion in a relationship abutting against the ball for locking the ball in the socket.

6. The link and ball socket assembly of claim 5 wherein the socket includes a wall defining a through aperture, the locking pin extending through the aperture and into the socket.

7. The link and ball socket assembly of claim 6 further comprising flexible clips projecting outwardly form the wall of the socket, the locking pin including a collar abutting against the clips for retaining the locking pin in the socket.

8. The link and ball socket assembly of claim 7 wherein the locking pin includes a distal end with an angled surface for guiding the locking pin into the aperture into the wall of the socket.

9. The link and ball socket assembly of claim 5 wherein the elongate link and the socket comprise a molded member.

10. The link and ball socket assembly of claim 5 further comprising another socket coupled to the second distal end of the elongate link and rotatable relative thereto.

11. The link and ball socket assembly of claim 10 wherein the elongate link and the other socket comprise a molded member.

12. A link and ball socket assembly for a vehicle chassis position sensor, the link and ball socket assembly comprising:
   an elongate link having opposing first and second distal ends;
   a first socket at the first distal end of the link, the socket defining an interior cavity including a first portion and a second ball shaped portion in communication with the first portion and extending in a direction away from the second distal end, the first socket adapted to receive a ball, the first socket including a first wall defining an interior recess in communication with the interior cavity and a second wall with a through aperture in communication with the interior cavity and a pair of clips projecting outwardly from an exterior surface thereof;
   a locking pin including a first distal end and an opposed distal end with a collar, the locking pin extending through the aperture in the second wall of the first socket and into the first portion of the first socket into a relationship with the first distal end of the locking pin seated in the recess in the first wall of the first socket and the collar of the locking pin abutted against the clips for retaining the locking pin on the first socket; and a second socket coupled to the second distal end of the elongate link, the second socket being rotatable relative to the elongate link.

13. The link and ball socket assembly of claim 12 wherein the first socket and the elongate link define a first molded member and the second socket and the elongate link define a second molded member.

* * * * *